Figure 1:
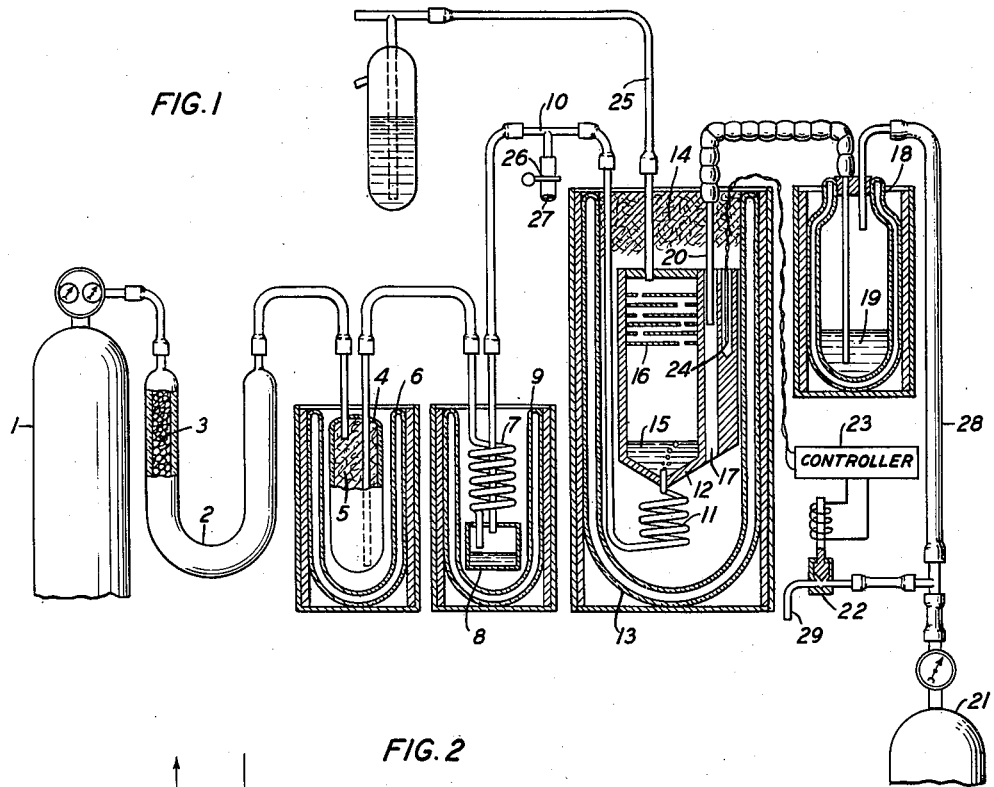

July 23, 1940. C. J. CHRISTENSEN 2,208,661

PURIFICATION OF GASES BY FRACTIONAL CONDENSATION

Filed Dec. 13, 1938

INVENTOR
C. J. CHRISTENSEN
BY
*B. H. Jackson*
ATTORNEY

Patented July 23, 1940

2,208,661

UNITED STATES PATENT OFFICE 2,208,661

PURIFICATION OF GASES BY FRACTIONAL CONDENSATION

Carl J. Christensen, Flushing, N. Y., assignor to Bell Telephone Laboratories, Incorporated, New York, N. Y., a corporation of New York Application December 13, 1938, Serial No. 245,340

7 Claims. (Cl. 62—122)

The present invention relates to a method and apparatus for purifying methane containing condensible impurities, such as higher hydrocarbons.

An object of the present invention is an economical method for obtaining relatively small quantities of methane of such high and controllable purity that it may be decomposed at elevated temperatures into a carbon which is capable of functioning as a high quality microphonic material. A further object is an apparatus with which such a method may be practiced.

In the preparation of carbon coated microphone granules according to the process described in U. S. Patent 1,973,703 to F. S. Goucher and C. J. Christensen, a carbonaceous gas such as a hydrocarbon gas is passed over a mass of granulated refractory material which is maintained at a high temperature and which is continuously tumbled. The hydrocarbon is cracked by the high temperature prevailing in the vicinity of the refractory material and forms a deposit of carbon on this material. The carbon deposit has characteristics which render it very suitable for microphonic use.

It has been found that the best microphone material is produced when the temperature of deposit is fairly high, of the order of 1000° C., and when the rate of deposit is not too great. Since methane is the most stable of the hydrocarbons and cracks only at temperatures in the neighborhood of 1000° C., it does not deposit carbon at these temperatures at a rate such as to produce an inferior microphone material. For this reason methane is a desirable gas for this use.

However, the methane obtainable commercially, which usually consists of partially purified natural gas, contains considerable amounts of higher hydrocarbon gases as impurities. The amount of these impurities may vary widely, as for instance between 5 and 15 per cent. When methane cracking temperatures are employed in forming a carbon deposit from commercial methane, the higher hydrocarbon gases, which are less stable, crack at an undesirably high rate and, therefore, lower the quality of the carbon deposit. Further, the variation in the amount of these impurities contained in different lots of the methane obtained on the market causes considerable variation in the quality and characteristics of microphone material manufactured from these gases. Therefore, it is impossible to obtain reproducibility of results under these conditions.

To obtain a sufficiently high quality deposit having uniform characteristics, it is necessary to purify the methane to a high degree of purity as, for instance, about 99 per cent, and it is necessary that there be no substantial deviation from this degree of purity. The usual method of separating similar mixtures of gases of different boiling points where such a high degree of purity is desired, is by liquefication of the gas mixture and subsequent fractional distillation. By such a procedure it would be theoretically possible to obtain practically complete separation of the higher boiling impurities from methane, so that a very pure methane gas would be obtained with the loss of only a very small quantity of methane by solution in the liquefied impurities. Although efficient from the standpoint of separation, such a procedure involves the use of such complicated equipment that it would be impractical and uneconomical for the purification of such small quantities of gas as would normally be required for the manufacture of deposits of microphonic carbon. The capacity of a purifying apparatus for this purpose need be of the order of only about a few cubic centimeters per minute to about 10 liters per minute. Therefore, until some other important use for methane of such high and constant purity were developed, the use of fractional distillation would not be commercially feasible for the production of such gas.

By approaching the purification from a gaseous state rather than from a liquid state, by a process of fractional condensation, a much simpler type of equipment is possible. Because of the fact that the vapor pressure of methane is widely separated from those of its impurities, it is theoretically possible to obtain methane of relatively high purity by a single stage or by several stages of fractional condensation. However, separation cannot be complete with a finite number of stages so that the purified methane gas will theoretically contain a small amount of impurities, and the condensed impurities will carry off a considerable amount of methane. To be feasible and economical the process must yield methane of the required purity without excessive loss of methane in the condensate.

Although it is not possible to calculate the phase distribution in a complex mixture of hydrocarbons, an indication of the behavior of such a mixture may be obtained by assuming the impurities to consist only of ethane, the hydrocarbon having a boiling point closest to that of methane and, therefore, being the most difficult to remove. If Dalton's law and Raoult's law are to be assumed to hold for such a mixture, as they are known to do to a high degree, the following distribution of the methane and ethane between the gas phase and the liquid phase is found by calculation, assuming a pressure of 840 millimeters. This pressure is slightly above atmospheric and is representative of a pressure at which purification could proceed when the apparatus is exhausting into a zone maintained at atmospheric pressure:

| T° C. | $P_m$ | $P_e$ | $N_e$ | $M_m$ |
|---|---|---|---|---|
| −120 | 10,000 | 90 | .0990 | .075 |
| −130 | 6,000 | 40 | .0412 | .135 |
| −140 | 3,600 | 15 | .0137 | .23 |
| −150 | 1,900 | 4.8 | .0032 | .44 |
| −155 | 1,350 | 2.5 | .0011 | .62 |
| −157 | 1,120 | 1.9 | .00056 | .75 |
| −159 | 940 | 1.4 | .00018 | .90 |
| −160 | 880 | 1.2 | .000065 | .95 |

In this table, T° C. represents the temperature in degrees centigrade at which the fractional condensation operation is conducted, $P_m$ represents the vapor pressure of the pure methane at the temperature indicated, $P_e$ represents the vapor pressure of pure ethane at the temperature indicated, $N_e$ represents the mol fraction of ethane remaining as an impurity in the gas, when the condensation is carried out at the temperature indicated, and $M_m$ represents the mol fraction of methane in the condensate when the condensation is carried out at the temperature indicated.

Figure 2:
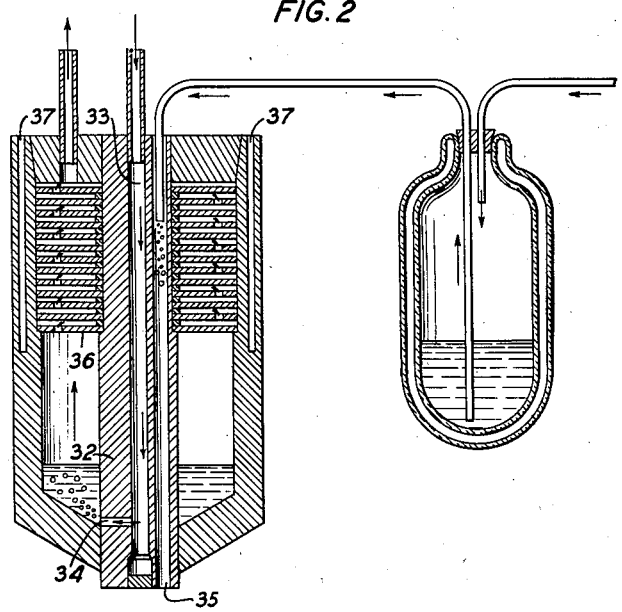

From this table it can be seen that, in theory, operation at −155° C. will yield a gas phase containing only about .1 per cent of ethane as an impurity. The theoretical result can be approached in actual practice only if the stream of gas being purified can be brought quickly to thermal and thermodynamic equilibrium and if the apparatus can be maintained at a sufficiently constant low temperature. The problems involved in achieving this result can best be understood by reference to the accompanying drawing in which:

Fig. 1 is a diagrammatic representation in section of the entire purifying apparatus; and Fig. 2 is a view of the section of a modified form of condensation chamber.

In the operation of the apparatus illustrated in Fig. 1 impure methane is supplied from any suitable source (1) at any suitable pressure. The gas is preliminarily dried by passage through a drying tube 2 filled with a suitable dehydrating agent 3, such as calcium chloride. It is further dried by passing it through a condenser 4 immersed in a cooling mixture of solid carbon dioxide and acetone contained in the Dewar flask 6 and containing a suitable filling material 5, such as glass wool, to aid in the condensation and removal of water produced by the cooling of the gas. This also serves to remove some of the more easily condensible impurities such as the butanes. The gas is given a further treatment of the above kind by passing through the condensing coil 7 which empties into a separation chamber 8. Both the condensing coil 7 and the separation chamber 8 are surrounded by a cooling mixture of solid carbon dioxide and acetone contained in the Dewar flask 9. In the separation chamber the condensed water, along with whatever butane and higher hydrocarbon gases are condensed at the temperature to which the gas is cooled, is separated from the remaining gaseous mixture. The dried gas passes off through the tube 10 into the fractional condensation apparatus.

The gas passes into the cooling coil 11, which is cooled by the gases produced from the evaporation of the refrigerant used to cool the condensation chamber 12. From the cooling coil 11 the gas passes into the lower portion of the condensation chamber 12, where it is bubbled through a pool 15 of condensate produced by the condensation of impurities within the chamber. After bubbling through the condensate, the gas passes upward in the chamber and back and forth over the baffles 16 which aid in bringing the gas into thermal and thermodynamic equilibrium. During its passage through the chamber the gas loses the greater portion of its impurities by way of condensation, and a substantial amount of methane is also condensed. The condensate is permitted to accumulate within the chamber during each run. After purification the gas passes off by way of tube 25 to storage or to a cracking furnace.

At the end of each run the condensate may be removed from the chamber by opening the valve 20 and applying a back pressure to the tube 25 so as to blow the condensate back through the coil 11 and tube 10 and out through tube 27.

The condensation chamber is cooled by the introduction of a liquefied refrigerant into contact with its walls. In the form of chamber shown in Fig. 1, a bore 17 is provided in one wall. The refrigerant is introduced near the top of this bore by means of a tube 20. The refrigerant evaporates as it passes down the bore, thus cooling the wall of the chamber. The evaporated refrigerant gas passes out the bottom of the bore and over the cooling coil 11 where it cools the incoming methane.

The liquid refrigerant 19 is contained in a suitable chamber 18 into which the opposite end of the tube 20 projects. Gas pressure is applied to the upper surface of the body of the refrigerant by means of a tube 28, which also projects within the vessel 18. The tube 28 is supplied with an inert gas under pressure from a suitable source 21.

The tube 28 is also capable of being connected with the atmosphere by means of the tube 29. An automatic valve 22 serves to open and close the tube 29, thus connecting and disconnecting tube 28 with the atmosphere. When the tube 28 is not connected with the atmosphere the gas pressure from source 21 is applied to the surface of the refrigerant and thus forces the refrigerant through the tube 20 into contact with the condensation chamber 12. When the tube 28 is connected with the atmosphere by the opening of the valve 22, no substantial gas pressure is applied to the refrigerant so that the flow of refrigerant into contact with the condensation chamber is interrupted.

The valve 22 is magnetically operated by suitable electrical means 23 controlled by means of a thermostatic element 24 mounted in the same wall of the condensation chamber as that which is cooled by the refrigerant. The valve is so controlled as to cause the flow of refrigerant when the temperature in the condensation chamber tends to rise above the desired value and to interrupt the flow when it tends to fall below the desired value. In this manner the desired temperature is accurately maintained in the condensation chamber.

The refrigerant is preferably one which has a boiling point, at the pressure which surrounds the condensation chamber, which is considerably lower than the temperature which it is desired to maintain in the chamber. When there is such a temperature difference, heat may be quickly withdrawn from the condensation chamber without appreciable lag. The refrigerant is also preferably inert to avoid any danger of explosion. Liquid nitrogen has been found very suitable for this purpose.

It is desirable that the temperature in the condensation chamber not be allowed to vary more than about 1° C. and preferably the temperature is held within ½° C. If the temperature were allowed to vary to any considerable extent, the vapor pressures of the constituents of the condensate would vary, causing a variation in the composition of the purified gas, due to a boiling off of some of the impurities or to a condensation of a greater percentage of the gas. The total pressure within the chamber would also change and, in the case of an increase in temperature, the increased pressure might force the condensate back through the cooling coil 11 into the preliminary purifying train, thus interrupting the operation of the apparatus.

To insure a constancy of temperature as well as a uniform distribution of temperature throughout the condensation chamber, the walls of this chamber are preferably formed of a considerable mass of a metal having a high heat conductivity and a high heat capacity. Thick walls of copper have been found to answer this purpose. Any change in temperature caused by the inflowing gas is quickly remedied by a flow of heat to the walls, which, because of their mass and high heat capacity, suffer little change in temperature due to this heat transfer. The heat received at the walls is periodically removed by contact with the evaporating refrigerant. Again the mass of the walls and their high heat capacity prevent any material temperature change due to the transfer of heat to the low temperature refrigerant. The periodicity of heat absorption by the refrigerant is thus ironed out by the heat capacity of the walls of the chamber. The high heat conductivity of the walls insures a rapid equalizing of the temperature throughout different parts of the walls and the interior of the chamber. The heat capacity and heat conductivity of the walls should be such that the temperature variation in the chamber does not vary more than about 1° C., or preferably ½° C., in spite of the absorption of heat from the warmer incoming gas and the periodic surrender of heat to the colder refrigerant.

The entire condensation unit is mounted within the Dewar flask 13 which prevents excessive absorption of heat from the surrounding atmosphere. The Dewar flask is closed at its upper end by a mass of porous heat-insulating material 14 which permits the escape of the gas produced by the evaporation of the refrigerant.

An alternative construction of the condensation chamber is illustrated in Fig. 2. In this modification the cooling coil 11 is replaced by a heavy metal tube 32 which runs downard through the center of the chamber. The gas to be purified is introduced into the bore 33 of the tube, near the top of the chamber. The gas passes downward through the bore and is introduced into the chamber near its bottom by means of the opening 34. The tube 32 contains a second bore 35 into which refrigerant is introduced. As in the modification shown in Fig. 1, baffles 36 are provided for bringing the gas into equilibrium. Suitable wells 37 are provided in the walls of the chamber for receiving the thermostat elements. In this modification a more uniform cooling is obtained since the refrigerant is introduced into a central portion of the chamber rather than one of its walls. Further, the incoming warm gas and the incoming refrigerant are introduced at nearly the same point so that the effect of each offsets the other somewhat, so that there is less likelihood of a substantial temperature variation between the top and bottom of the chamber.

As has been stated above, —155° C. is a desirable temperature of operation at 840 millimeters pressure since at this temperature a high degree of purity is obtained. According to the table given above, when a gas mixture of methane and ethane is employed, the condensate at —155° C. will be made up of 62 mol per cent of methane and 38 mol per cent of ethane. When there is very little impurity in the original gas so that there is little condensate, the methane loss is small. As the amount of impurity increases, the methane loss increases. If only 62 per cent methane were present in the initial gas mixture, all of the methane would be lost in the condensate and no purified gas would be produced.

Where the amount of impurity is considerable, an additional condensation stage may be employed to reduce the amount of methane lost without impairing the purity of the final gas. In such a procedure the initial gas would be cooled in the same type of apparatus as described to a temperature higher than —155° C., such as, for instance —120° C. At this temperature the amount of methane in the condensate is only 7.5 per cent and the amount of impurity remaining in the gas is 9.9 per cent. The partially purified gas may then be passed through a second stage at about —155° C. to produce the high purity gas. The amount of condensate produced in the second stage will be small so that the methane loss will not be great.

To carry out such a procedure two condensation chambers in series may be employed or the gas may be passed once through a single condensation chamber at the higher temperature and again in a second run through the same apparatus with the thermostat so regulated that the temperature is maintained at the lower temperature. It is an advantage of the apparatus described that runs of this type may be made at different temperatures without sacrificing the close temperature control of each run.

The process has been described as carried out at substantially atmospheric pressure since the equipment necessary for such a procedure is simpler than when higher pressures are employed. However, it is to be understood that higher or lower pressures may be used if desired. For each degree of purity desired, it will be necessary to select the proper temperature of condensation to correspond to the pressure employed.

Although —155° C. has been stated to be the most desirable operating temperature at 840 millimeters, obviously any other temperature may be employed, depending upon the degree of purity desired.

The baffles shown in the condensation chambers may be replaced by any other suitable means for inducing equilibrium. Thus the condensation chamber may be packed with filling material such as absorbent charcoal and/or copper millings.

Although the invention has been described in terms of its specific embodiments, certain modifications will be obvious to one skilled in the art and the scope of the invention is to be limited only by the terms of the appended claims.

What is claimed is:

1. The method of obtaining methane of constant purity from methane containing impurities of lower vapor pressure, comprising introducing said impure methane into a closed vessel formed of a highly heat-conductive material and having walls of such thickness that the vessel has a high heat capacity, maintaining the temperature in the vessel at a substantially constant value sufficiently low to cause the condensation of the greater portion of the condensable impurities in the methane by bringing a liquefied refrigerant having a boiling point below the temperature desired in the vessel into heat exchange relationship with the walls of the vessel at a thermostatically controlled rate such as to maintain the desired temperature in the vessel, the heat capacity and heat conductivity of the walls of the vessel being sufficiently high to permit absorption of heat from the warmer methane and surrender of heat to the colder refrigerant without a temperature change within the vessel in excess of about 1° C., retaining the methane in the vessel until substantial equilibrium is obtained between the gas and the condensed impurities, and withdrawing the methane of constant purity from the vessel.

2. The method of obtaining methane of constant purity from methane containing impurities having a lower vapor pressure comprising introducing said impure methane at substantially atmospheric pressure into a closed vessel formed of a highly heat-conductive material and having walls of such thickness that the vessel has a high heat capacity, maintaining the temperature in the vessel at about —155° C., by bringing a liquefied refrigerant having a boiling point of below —155° C. into heat exchange relationship with the walls of the vessel at a thermostatically controlled rate such as to maintain the desired temperature in the vessel, the heat capacity and heat conductivity of the walls of the vessel being sufficiently high to permit absorption of heat from the warmer methane and surrender of heat to the colder refrigerant without a temperature change within the vessel in excess of about 1° C., retaining the methane in the vessel until substantial equilibrium is obtained between the gas and the condensed impurities, and withdrawing the methane of constant purity from the vessel.

3. The method of obtaining methane of constant purity from methane containing impurities having a lower vapor pressure comprising introducing said impure methane at substantially atmospheric pressure into a closed vessel formed of a highly heat-conductive material and having walls of such thickness that the vessel has a high heat capacity, maintaining the temperature in the vessel at about —155° C., by bringing liquefied nitrogen into heat exchange relationship with the walls of the vessel at a thermostatically controlled rate such as to maintain the desired temperature in the vessel, the heat capacity and heat conductivity of the walls of the vessel being sufficiently high to permit absorption of heat from the warmer methane and surrender of heat to the colder refrigerant without a temperature change within the vessel in excess of about 1° C., retaining the methane in the vessel until substantial equilibrium is obtained between the gas and the condensed impurities, and withdrawing the methane of constant purity from the vessel.

4. An apparatus for removing condensible impurities from a gas by fractional condensation comprising a condensation chamber having walls of high heat conductivity and high heat capacity, said chamber being so constructed as to have a space wherein a pool of condensed impurities may collect, means for introducing the gas to be purified into the chamber at a point at which the gas will bubble through said pool of condensed impurities, means for introducing a liquefied refrigerant into heat exchange relationship with the walls of the chamber and means responsive to temperature changes in said chamber for controlling the rate of introduction of said refrigerant.

5. An apparatus for removing condensible impurities from a gas by fractional condensation comprising a condensation chamber having walls of high heat conductivity and high heat capacity, means for introducing gas into the chamber, means within the chamber for increasing the surface contact of gas in order to bring the gas rapidly to thermal and thermodynamic equilibrium with impurities condensed from the gas, means for withdrawing the purified gas from the chamber, means for introducing a liquefied refrigerant into heat exchange relationship with the walls of the chamber and means responsive to temperature changes in said chamber for controlling the rate of introduction of said refrigerant.

6. An apparatus for removing condensable impurities from gas by fractional condensation comprising a condensation chamber having walls of high heat conductivity and high heat capacity, means for introducing the gas to be purified into said chamber, a heat insulated vessel surrounding said condensation chamber, a vessel containing a liquefied refrigerant exterior of said heat insulated vessel, means for conveying said liquefied refrigerant from said vessel containing it into heat exchange relationship with the outside walls of said condensation chamber, and means responsive to temperature changes in said chamber for controlling the rate of introduction of said refrigerant in such manner that no substantial amount of liquid refrigerant accumulates in said heat insulated vessel.

7. An apparatus for removing condensable impurities from gas by fractional condensation comprising a condensation chamber having walls of high heat conductivity and high heat capacity, means for introducing the gas to be purified into said chamber, a heat insulated vessel surrounding said condensation chamber, a vessel containing a liquefied refrigerant exterior of said heat insulated vessel, means for conveying said liquefied refrigerant from said vessel containing it into heat exchange relationship with the outside walls of said condensation chamber, means for introducing a gas under pressure into said vessel containing said refrigerant in such manner as to force a quantity of said refrigerant through said conveying means into heat exchange relationship with said condensation chamber, and means responsive to temperature changes in said condensation chamber for interrupting the introduction of said gas into said refrigerant-containing vessel when the temperature in the condensation chamber reaches the desired low value and for causing the flow of gas to be resumed when the temperature in the chamber rises above the desired value.

CARL J. CHRISTENSEN.